Patented Dec. 21, 1937

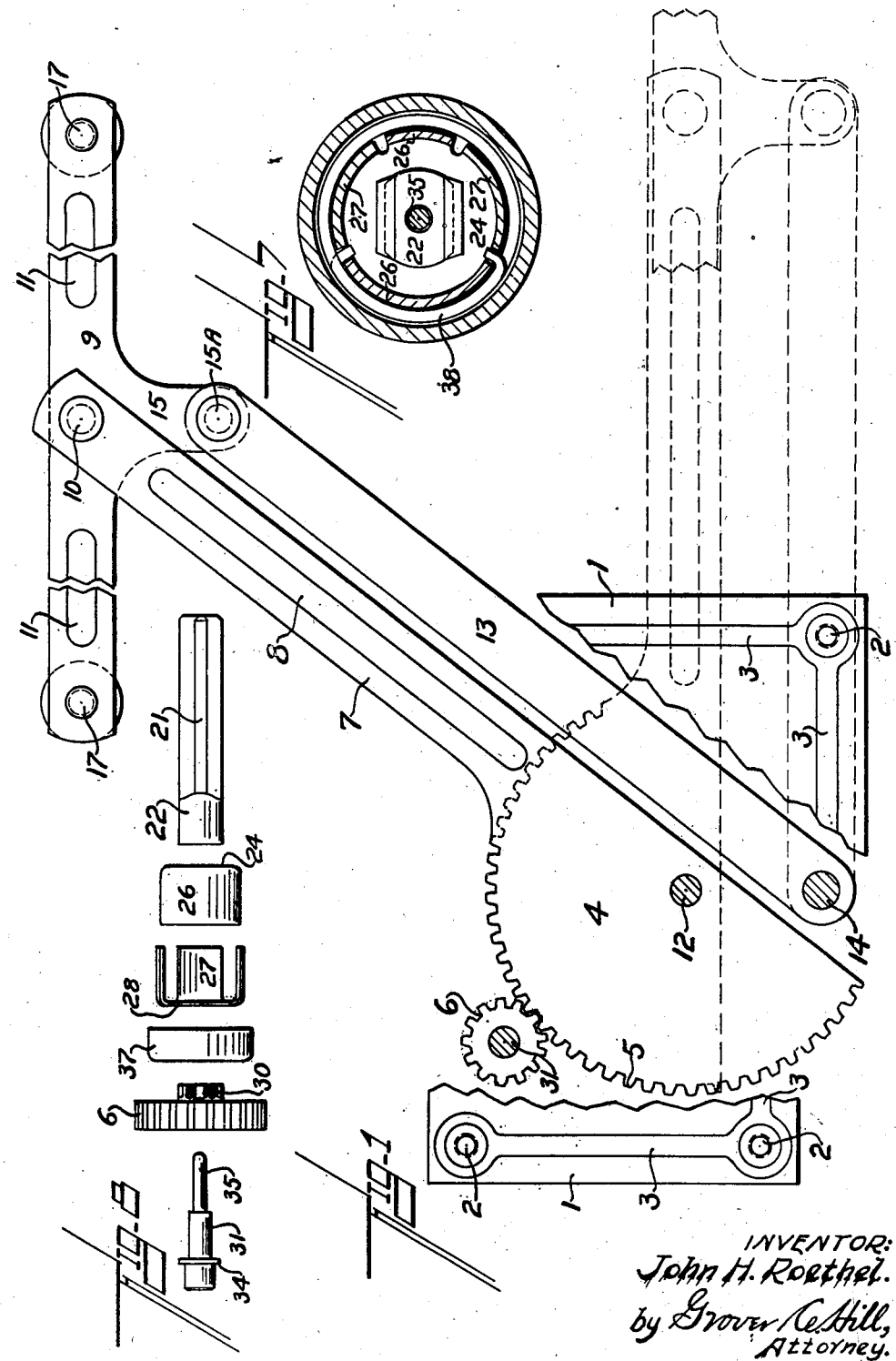

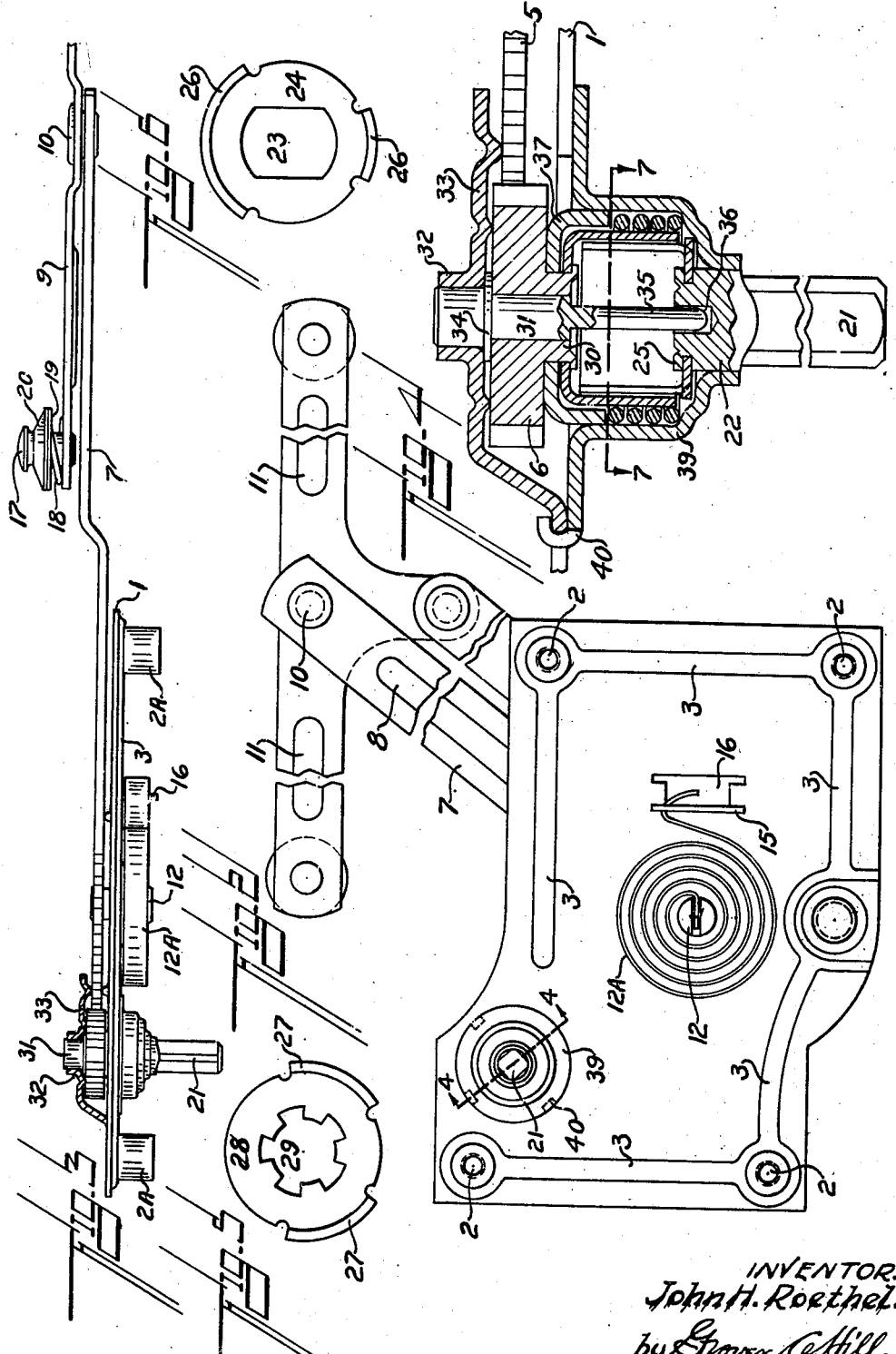

2,103,223

UNITED STATES PATENT OFFICE 2,103,223

WINDOW CONTROL MECHANISM

John H. Roethel, Detroit, Mich.

Application March 21, 1931, Serial No. 524,298

12 Claims. (Cl. 268—126)

My invention relates to controlling mechanisms for windows, and is particularly adapted for use in motor vehicle bodies or the like for the purpose of elevating and lowering the glass thereof.

An object of the invention is to provide an improved window control mechanism or regulator adapted to be installed within the door or body of the automobile or vehicle and embodying a pair of parallel swinging arms and associated parts so constructed, supported and arranged with relation to the window as to cause the glass to move in a true vertical course, while maintaining the glass against tilting in any position thereof.

With reference to the drawings:

Figure 1 is a clear view of the glass connecting mechanism with the supporting plate thereof broken as indicated, the full and dotted lines in this view showing different positions of the arms of the said mechanism.

Figure 2 is an elevation of the complete device with the glass connecting arms broken as indicated.

Figure 3 is a top plan view of the complete device.

Figure 4 is an enlarged section taken substantially upon line 4—4 of Figure 2.

Figure 5 is a view of one of the internal expanding members, and Figure 6 is a view of a similar expanding member.

Figure 7 is a section taken substantially upon line 7—7 of Figure 4.

Figure 8 is a fragmentary view of elements in Figure 4.

In its present preferred form the apparatus includes a supporting plate 1 which is provided with screw bosses 2A having holes 2 through which the plate may be secured within the door or body of the vehicle. This plate may be embossed at 3 for reinforcement. Secured to a rotatable stud 12 carried by the support 1 is a gear segment 4 having peripheral teeth 5 meshing with the teeth of a pinion 6.

Extending from the gear 4 is a swinging operating arm 7 which may be in the form of a stamping having a strengthening rib 8. The outer end of this arm is pivoted by means of a shouldered rivet 10 to a horizontal bar 9. This bar acts as a carrier for the window and is connected thereto for moving the window up and down. The bar 9 is reinforced by ribs 11 and is slidingly connected to the customary channel of the window glass by means of studs 17 and washers 19, 20 held in position within the channel by springs 18. Thus, as the window is shifted vertically the bar 9 will slide horizontally, as shown by the full and dotted line positions thereof in Fig. 1.

The carrier member 9 forms a firm, non-tiltable support for the lower edge of the glass, supporting the same at horizontally spaced points at opposite sides of pivot 10. This member is maintained at all times in horizontal position by means of a second arm 13 which, as shown in the drawings, extends parallel to the arm 7 in any position thereof. The arm 7 at its lower end is pivoted by means of a stud 14 to the supporting plate 1, and at its upper end is pivoted at 15A to a downward extension 15 of the bar 9. It will be noted that arms 7 and 13 lie in the same plane, and since the pivoted points 10 and 15A, and 12 and 14, are vertically spaced and equidistant, the arms will at all times swing in parallel relation when the gear 4 is turned.

The window is counterbalanced by means of a spring 12A one end of which is anchored in a slot in the stud 12 and the other end fastened to a lug 15 punched at 16 from the metal of the plate.

The mechanism is operated by the usual crank adapted to be secured to the square end 21 of shaft 22. A locking device is provided to hold the window in any adjusted position and to lock the window against vertical movement except when the handle or crank is turned to rotate shaft 21. The end of this shaft is fastened in an opening 23 of a disk 24 provided with upturned segments or tongues 26. The hub 30 of pinion 6 is fastened in an opening 29 of a disk 28 provided with downturned projections or tongues 27. The segments 26 and 27 interlock with one another as shown in Fig. 7 and form a coupling for driving the pinion 6 from the shaft 21 upon turning the shaft in either direction.

Surrounding the coupling members 26 and 27 is a torsion spring 38 which is snugly housed within a cap 39 secured to the plate 1 by means of ears 40. The ends of this spring are lodged between the opposite ends of member 26 and the corresponding ends of members 27 as shown in Fig. 7. These segmental members, which act as guides for retaining the spring in proper position, provide together with the spring 38 and housing 39 a means for locking the shaft and pinion at all times except when the shaft itself is operated for raising or lowering the window. Thus, upon turning the shaft in either direction the segment 26 will exert a pull on one of the ends of the spring, thereby contracting the spring and freeing it from binding engagement with the housing 39. Hence, the coupling members or segments 26, 27 will then turn freely and drive the pinion 6. When the shaft 21 is released, and any force acts on the pinion tending to turn it, the segments 27, depending upon the direction the pinion is turned, will be propelled against an end of the spring, expanding it tightly against the inside of the housing and thereby locking the parts together.

The pinion 6 is fastened to a shaft 31 journaled in a bearing portion 32 of a cap 33, the latter being secured to the support 1. This shaft may be formed with a flange 34 interposed between the cap and pinion, and also has guide shank or stem 35 centered in a recess 36 in the shaft 22.

It will be seen, therefore, that by virtue of the parallel swinging arms 7 and 13, and the connecting bar 9, the window glass may be positively raised or lowered in a true vertical direction. Due to the relation of these arms the bar will be rigidly maintained in horizontal position and hence the window glass held in fixed relation to the operating mechanism against any tendency to cant or tilt.

Having thus described my invention, what I claim is:

1. In a window regulating mechanism, the combination of a horizontally movable member adapted to be connected to a window, a support, a gear rotatable on said support and having a projecting arm pivoted to said member for moving the window vertically, and a second arm parallel to the first arm and pivoted to the support and member at vertically spaced points equidistant from the axis of rotation of said gear and the pivot of the first arm to said member.

2. In a window regulator, the combination of a bar adapted to be slidingly connected to a window at spaced points, a pair of parallel swinging arms pivoted to said bar intermediate said points, a support, a gear carried thereby and fixed to only one of said arms to swing the same, and a pivot connecting the second arm with the support whereby said arms will swing in the same parallel relation throughout the movement of the window.

3. In a window regulator, the combination of a bar having laterally spaced devices for movably connecting the bar to a window, a pair of parallel swinging arms pivoted to said bar at spaced points one below the other, a support, a gear carried thereby and connected to one of said arms to swing the same, and a pivot connecting the second arm to the support at a point below the axis of swinging of the first arm and bearing the same relation to said axis as the relation of the pivotal points of connection of the arms to said bar.

4. In a regulator for raising and lowering a window glass, a support, a pair of parallel swinging arms pivoted on the support at spaced fixed points one above the other, a laterally movable substantially horizontal bar pivoted to the outer ends of said arms at correspondingly spaced fixed points and maintained thereby in constant angular position, said bar having a depending angular extension to which at least one of said arms is pivoted, horizontally spaced devices mounted on said bar at fixed points for slidingly connecting the bar to the lower edge of the window glass and for maintaining the latter against tilting movement.

5. In a window regulator, a horizontal member having horizontally spaced fixed devices slidingly connecting the member to the lower edge of a window glass and effective to maintain the glass in constant angular position, a fixed support, a gear mounted thereon and having fixed thereto a swinging arm pivoted to said member, and a second swinging arm pivoted to the support and horizontal member at points equidistant and vertically spaced from the pivot of the first arm to the horizontal member and the axis of rotation of the gear.

6. In a window regulator, the combination of a member adapted to be connected to the lower edge of a window for movement relatively thereto, a pair of swinging arms pivoted to said member at relatively fixed points spaced in a vertical direction, a support, a gear carried thereby and connected to only one of said arms to swing the same, and a pivotal connection between said second arm and said support at a point spaced in a vertical direction from the axis of swinging of the first arm a distance equal to the distance between the pivotal points of connection of the arms with said member, said member having means for maintaining the window against tilting movement during operation of the regulator.

7. In a window regulator, the combination of a pair of swinging arms, means for supporting said arms to swing in parallel relation, a member pivotally connected to said arms at points spaced in a vertical direction and adapted to be connected to the lower edge of a window, said member being held in constant angular position with relation to the horizontal during swinging movement of said arms, means for swinging said arms, and means carried by said member for connection to the window at a plurality of laterally spaced points.

8. In a window regulating mechanism, the combination of a horizontally movable member having means adapted to support a window at a plurality of laterally spaced points, a support, a gear rotatable on said support and having in operative connection therewith an arm pivoted to the support and to said member for moving the window vertically, and a second arm movable in parallelism to the first arm and pivoted to the support and said member at points equidistant and spaced in a vertical direction from the pivots of said first arm to the support and member.

9. In a window regulator, a horizontal member having horizontally spaced fixed devices slidingly connecting the member to the lower edge of a window glass and effective to maintain the glass in constant angular position, a fixed support, a gear mounted thereon and having fixed thereto a swinging arm pivoted to said member, and a second swinging arm pivoted to the support and horizontal member at points equidistant and vertically spaced from the pivot of the first arm to the horizontal member and the axis of swinging of the first arm.

10. In a window regulator, a horizontal member having horizontally spaced fixed devices adapted to connect the member to the lower edge of a window glass and effective to maintain the glass in constant angular position, a fixed support, a driving member mounted thereon and having fixed thereto a swinging arm pivoted to said horizontal member, and a second swinging arm pivoted to the support and horizontal member at points equidistant and spaced in a vertical direction from the pivot of the first arm to the horizontal member and the axis of swinging of the first arm.

11. In a window regulator, a horizontal member having means positioned along its length for connecting the member to the lower edge of a window glass and effective to maintain the glass in constant angular position, a fixed support, a driving member mounted thereon, a swinging arm connected to said driving member to be swung thereby and pivoted to said support and to said horizontal member, and a second swinging arm pivoted to said support and horizontal member at points equidistant and spaced in a vertical direction from the pivot of the first arm to the horizontal member and the axis of swinging of the first arm.

12. In a regulator for raising and lowering a window glass, a support, a pair of arms adapted to swing in parallelism and pivoted on the support at spaced normally fixed points one above the other, a laterally movable substantially horizontal bar pivoted to the outer ends of said arms at correspondingly spaced normally fixed points and maintained thereby in constant angular position, said bar having an angular extension to which at least one of said arms is pivoted, and means disposed along the length of the bar in a horizontal direction and fixed thereto for connecting the bar to the lower edge of the window glass and providing a support for the glass at more than two points to maintain the glass against tilting movement in its plane.

JOHN H. ROETHEL.